US007912092B2

(12) United States Patent
Kowalski

(10) Patent No.: US 7,912,092 B2

(45) Date of Patent: Mar. 22, 2011

(54) SYSTEMS AND METHODS FOR TRANSMITTING A TRANSMISSION TIME INTERVAL SIGNAL WITH STAGGERED REFERENCE SIGNALS

(75) Inventor: John M. Kowalski, Camas, WA (US)

(73) Assignee: Sharp Laboratories of America, Inc., Camas, WA (US)

(*) Notice: Subject to any disclaimer, the term of this patent is extended or adjusted under 35 U.S.C. 154(b) by 717 days.

(21) Appl. No.: 11/616,651

(22) Filed: Dec. 27, 2006

(65) Prior Publication Data

US 2008/0159250 A1 Jul. 3, 2008

(51) Int. Cl.
*H04B 3/10* (2006.01)

(52) U.S. Cl. ........ 370/491; 370/464; 370/480; 370/498; 370/535

(58) Field of Classification Search .................. 370/464, 370/498, 535, 480, 491
See application file for complete search history.

(56) References Cited

U.S. PATENT DOCUMENTS

| | | | | |
|---|---|---|---|---|
| 6,535,502 | B1 * | 3/2003 | Brink | 370/345 |
| 7,315,748 | B2 * | 1/2008 | Ahn et al. | 455/502 |
| 7,493,129 | B1 * | 2/2009 | Mostafa et al. | 455/502 |
| 2003/0063654 | A1 * | 4/2003 | Onggosanusi et al. | 375/130 |
| 2004/0106425 | A1 * | 6/2004 | Koo et al. | 455/522 |
| 2005/0265226 | A1 * | 12/2005 | Shen et al. | 370/210 |
| 2007/0071127 | A1 * | 3/2007 | Gore et al. | 375/267 |
| 2007/0135166 | A1 * | 6/2007 | Ding et al. | 455/561 |
| 2008/0043708 | A1 * | 2/2008 | Muharemovic et al. | 370/348 |

FOREIGN PATENT DOCUMENTS

| | | |
|---|---|---|
| EP | 1865637 | 12/2007 |
| JP | 2006013610 | 1/2006 |
| JP | 2008502225 | 1/2008 |
| WO | 2005122425 | 12/2005 |
| WO | 2005122458 | 12/2005 |
| WO | 2005122516 | 12/2005 |
| WO | 2005122517 | 12/2005 |
| WO | 2005122627 | 12/2005 |
| WO | 2006118124 | 11/2006 |

OTHER PUBLICATIONS

3G PP TR 25.814 v7.1.0, Technical Specification Group Radio Access Network; Physical layer aspects for evolved Universal Terrestrial Radio Access (UTRA) (Release 7) Sep. 2006.*

R1-063128, Ericsson, Uplink reference Signals.*

R1-063309, DoCoMo et al., Reference Signal Sequence Allocation Method in E-UTRA Uplink.

(Continued)

*Primary Examiner* — William Trost, IV
*Assistant Examiner* — Siming Liu
(74) *Attorney, Agent, or Firm* — Austin Rapp & Hardman

(57) ABSTRACT

A method for transmitting a transmission time interval signal in a cellular network is described. A multiplexed data signal is received. A demultiplexer is applied to the data signal. The data signal from the demultiplexer is encoded. A linear transform is applied to the data signal. A plurality of uplink transmission time interval signals, which include the data signal, are reformatted. The placement of one or more reference signals are staggered within each of the plurality of transmission time interval signals. Each of the plurality of uplink transmission time interval signals are transmitted.

18 Claims, 10 Drawing Sheets

700

Start

Receive a multiplexed data signal — 702

Apply a demultiplexer to the data signal — 704

Encode each data signal from the demultiplexer — 706

Apply a linear transform to the data signal — 708

Reformat a plurality of uplink transmission time interval (TTI) signals — 710

Stagger the placement of a reference signal within each of the plurality of TTI signals — 712

Transmit each of the plurality of uplink TTI signal — 714

End

OTHER PUBLICATIONS

3GPP TR 25.814 V7.1.0, Technical Specification Group Radio Access Network; Physical layer aspects for evolved Universal Terrestrial Radio Access (UTRA) (Release 7). S. Adreddy and L. Tong, "Optimal Placement of Known Symbols for Nonergodic Broadcast Channels," 2002 Conference on Information Science and Systems, Princeton University.

S. Adreddy, L. Tong, and H. Viswanathan, "Optimal Placement of Training for Frequency-Selective Block Fading Channels," IEEE Transactions on Information Theory, vol. 48, No. 8, Aug. 2002.

Aris Papasakellariou, e-mail on UL RS received Monday Dec. 11, http://list.3gpp.org/scripts/wa.exe?A2=ind0612&L=3gpp_tsg_ran_wg1&T=0&P=7132.

* cited by examiner

800

802 804

| First reference signal position | Second reference signal position |
|---|---|
| 1 | 8 |
| 2 | 9 |
| 3 | 10 |
| 4 | 11 |
| 5 | 12 |
| 6 | 13 |
| 7 | 14 |

FIG. 8

SYSTEMS AND METHODS FOR TRANSMITTING A TRANSMISSION TIME INTERVAL SIGNAL WITH STAGGERED REFERENCE SIGNALS

TECHNICAL FIELD

The present invention relates generally to computers and computer-related technology. More specifically, the present invention relates to systems and methods for transmitting a transmission time interval signal with staggered reference signals.

BACKGROUND

A wireless communication system typically includes a base station in wireless communication with a plurality of user devices (which may also be referred to as mobile stations, subscriber units, access terminals, user equipment, etc.). The base station transmits data to the user devices over a radio frequency (RF) communication channel. The term "downlink" refers to transmission from a base station to a user device, while the term "uplink" refers to transmission from a user device to a base station.

Orthogonal frequency division multiplexing (OFDM) is a modulation and multiple-access technique whereby the transmission band of a communication channel is divided into a number of equally spaced sub-bands. A sub-carrier carrying a portion of the user information is transmitted in each sub-band, and every sub-carrier is orthogonal with every other sub-carrier. Sub-carriers are sometimes referred to as "tones." OFDM enables the creation of a very flexible system architecture that can be used efficiently for a wide range of services, including voice and data. OFDM is sometimes referred to as discrete multitone transmission (DMT).

Reference signals are transmitted with data signals in a transmission time interval signal (TTI) in order to demodulate the data. Multiple signals sent from multiple mobile stations cause interference with each other and may cause errors in the demodulation of the data. As such, benefits may be realized from systems and methods for transmitting the transmission time interval signal with staggered reference signals.

BRIEF DESCRIPTION OF THE DRAWINGS

Exemplary embodiments of the invention will become more fully apparent from the following description and appended claims, taken in conjunction with the accompanying drawings. Understanding that these drawings depict only exemplary embodiments and are, therefore, not to be considered limiting of the invention's scope, the exemplary embodiments of the invention will be described with additional specificity and detail through use of the accompanying drawings in which:

FIG. 8 is one embodiment of a reference signal placement table;

DETAILED DESCRIPTION

Figure 1:
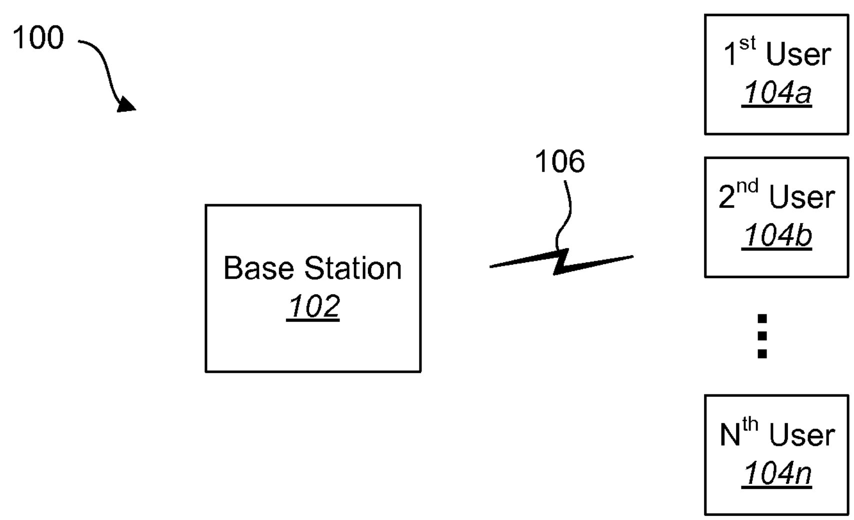
FIG. 1 illustrates an exemplary wireless communication system in which embodiments may be practiced.

A method for transmitting a transmission time interval signal in a cellular network is described. A multiplexed data signal is received. A demultiplexer is applied to the data signal. The data signal from the demultiplexer is encoded. A linear transform is applied to the data signal. A plurality of uplink transmission time interval signals, which include the data signal, are reformatted. The placement of one or more reference signals are staggered within each of the plurality of transmission time interval signals. Each of the plurality of uplink transmission time interval signals are transmitted.

In one embodiment, timing parameters within adjacent cells of one of the plurality of transmission time interval signals are reformatted. The one or more reference signals may be transmitted simultaneously with one or more data signals. Each of the one or more reference signals may be transmitted during different time periods. Each of the plurality of transmission time interval signals may comprise fourteen long blocks. Each of the fourteen long blocks may comprise a length of 66.67 microseconds (μs). In one embodiment, each of the fourteen long blocks comprises a cyclic prefix. Each of the plurality of transmission time interval signals may comprise a length of one millisecond (ms).

An apparatus that is configured to transmit a transmission time interval signal in a cellular network is also described. The apparatus includes a processor and memory in electronic communication with the processor. Instructions are stored in the memory. A multiplexed data signal is received. A demultiplexer is applied to the data signal. The data signal from the demultiplexer is encoded. A linear transform is applied to the data signal. A plurality of uplink transmission time interval signals, which include the data signal, are reformatted. The placement of one or more reference signals are staggered within each of the plurality of transmission time interval signals, wherein the one or more reference signals are received with multiple access interference related to data. Each of the plurality of uplink transmission time interval signals are transmitted.

A method for allocating positions for a reference signal within a transmission time interval in a cellular network is also described. Granularity of resource block assignments durations is analyzed. A determination is made if the granularity of resource block assignment durations is greater than a first time period. An indicator comprising a first number of bits or a second number of bits, depending on the determination, is transmitted.

A method for transmitting information amongst a plurality of base transceiver stations in a cellular network is also described. A transmission interval signal is received. Placement of one or more reference signals within the transmission time interval signal is analyzed. A determination is made if the placement of the one or more reference signals includes a timing shift. Shifting information based on the determination is transmitted.

Various embodiments of the invention are now described with reference to the Figures, where like reference numbers indicate identical or functionally similar elements. The embodiments of the present invention, as generally described and illustrated in the Figures herein, could be arranged and designed in a wide variety of different configurations. Thus, the following more detailed description of several exemplary embodiments of the present invention, as represented in the Figures, is not intended to limit the scope of the invention, as claimed, but is merely representative of the embodiments of the invention.

The word "exemplary" is used exclusively herein to mean "serving as an example, instance, or illustration." Any embodiment described herein as "exemplary" is not necessarily to be construed as preferred or advantageous over other embodiments.

Many features of the embodiments disclosed herein may be implemented as computer software, electronic hardware, or combinations of both. To clearly illustrate this interchangeability of hardware and software, various components will be described generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

Where the described functionality is implemented as computer software, such software may include any type of computer instruction or computer executable code located within a memory device and/or transmitted as electronic signals over a system bus or network. Software that implements the functionality associated with components described herein may comprise a single instruction, or many instructions, and may be distributed over several different code segments, among different programs, and across several memory devices.

As used herein, the terms "an embodiment", "embodiment", "embodiments", "the embodiment", "the embodiments", "one or more embodiments", "some embodiments", "certain embodiments", "one embodiment", "another embodiment" and the like mean "one or more (but not necessarily all) embodiments of the disclosed invention(s)", unless expressly specified otherwise.

The term "determining" (and grammatical variants thereof) is used in an extremely broad sense. The term "determining" encompasses a wide variety of actions and therefore "determining" can include calculating, computing, processing, deriving, investigating, looking up (e.g., looking up in a table, a database or another data structure), ascertaining and the like. Also, "determining" can include receiving (e.g., receiving information), accessing (e.g., accessing data in a memory) and the like. Also, "determining" can include resolving, selecting, choosing, establishing and the like.

The phrase "based on" does not mean "based only on," unless expressly specified otherwise. In other words, the phrase "based on" describes both "based only on" and "based at least on."

The 3rd Generation Partnership Project (3GPP) is a collaboration of standards organizations throughout the world. The goal of 3GPP is to make a globally applicable third generation (3G) mobile phone system specification within the scope of the IMT-2000 (International Mobile Telecommunications-2000) standard as defined by the International Telecommunication Union. The 3GPP Long Term Evolution ("LTE") Committee is considering OFDM as well as OFDM/OQAM (Orthogonal Frequency Division Multiplexing/Offset Quadrature Amplitude Modulation), as a method for downlink transmission, as well as OFDM transmission on the uplink.

In the 3GPP LTE, Discrete Fourier Transform (DFT) spread OFDM is envisaged as the physical layer technology for the uplink (mobile to base station). Time and frequency resources may be allocated to a number of mobiles, which may be referred to as user equipment (UE). These resources may be orthogonal within a cell/sector (or Node B). In other words, within a cell/sector, two UEs may not be assigned the same frequency resources at the same time.

In one embodiment, it may be desirable to maintain frequency and time re-use to unity amongst a plurality of cells/sectors. For example, cells/sectors within a given area may be transmitting in all frequencies at the same time. Further, a reference signal may be sent to coherently demodulate a data signal. In order to achieve a resource re-use of unity amongst multiple cells/sectors, it may be desirable to obtain a correlation between reference signals that is as small as possible.

Current solutions attempt to achieve this by choosing reference signals from among an orthogonal basis set; e.g., cyclic shifts of a Zadoff-Chu sequence. However, the number of such sequences for the smallest resource allocations is quite small; the smallest allocation may allow for approximately 10 sequences when 12 carriers are assigned, and these sequences may not all be orthogonal; thus orthogonality of these sequences may not be guaranteed for small time/frequency resource block assignments. Furthermore, it may be desirable that the sequences be able to be allocated with minimal planning on the part of a service provider.

Currently proposed schemes may include sequence hopping and Walsh modulation of Zadoff-Chu sequences; however, these schemes may still represent an undue burden on the operator for planning, and may provide minimal increase in the number of sequences. Given that inter-site cell distances can range from 500 m to 10 Km or more for evolved 3GPP, a method to increase the re-use of reference signals may dramatically improve a telecommunications system.

FIG. 1 illustrates an exemplary wireless communication system 100 in which embodiments may be practiced. A base station 102 is in wireless communication with a plurality of user devices 104 (which, as indicated above, may also be referred to as mobile stations, subscriber units, access terminals, user equipment, etc.). A first user device 104*a*, a second user device 104*b*, and an Nth user device 104*n* are shown in FIG. 1. The base station 102 transmits data to the user devices 104 over a radio frequency (RF) communication channel 106.

As used herein, the term "Orthogonal Frequency-Division Multiplexing (OFDM) transmitter" refers to any component or device that transmits OFDM signals. An OFDM transmitter may be implemented in a base station 102 that transmits OFDM signals to one or more user devices 104. Alternatively, an OFDM transmitter may be implemented in a user device 104 that transmits OFDM signals to one or more base stations 102.

The term "OFDM receiver" refers to any component or device that receives OFDM signals. An OFDM receiver may be implemented in a user device 104 that receives OFDM signals from one or more base stations 102. Alternatively, an OFDM receiver may be implemented in a base station 102 that receives OFDM signals from one or more user devices 104.

Figure 2:
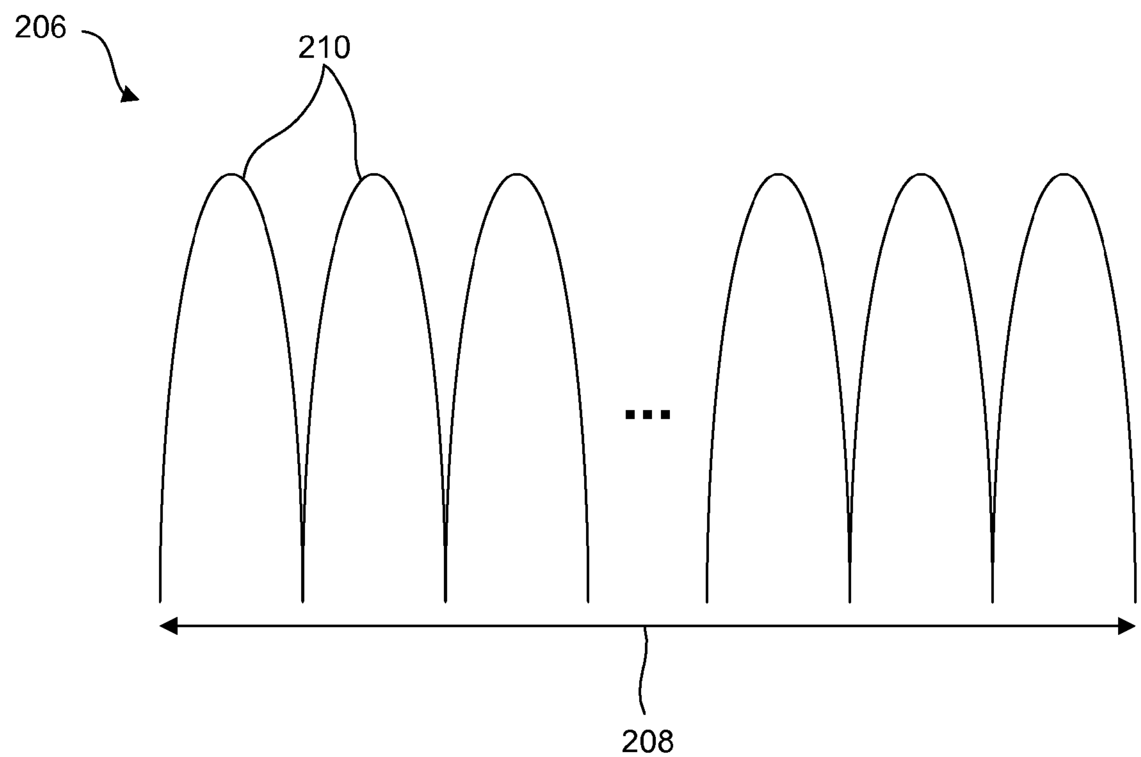
FIG. 2 illustrates some characteristics of a transmission band of an RF communication channel in accordance with an orthogonal frequency division multiplexing (OFDM) based system.

FIG. 2 illustrates some characteristics of a transmission band 208 of an RF communication channel 206 in accordance with an OFDM-based system. As shown, the transmission band 208 may be divided into a number of equally spaced sub-bands 210. As mentioned above, a sub-carrier carrying a portion of the user information is transmitted in each sub-band 210, and every sub-carrier is orthogonal with every other sub-carrier.

Figure 3:
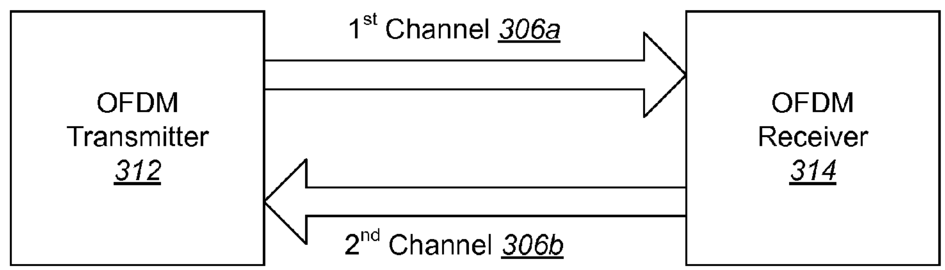
FIG. 3 illustrates communication channels that may exist between an OFDM transmitter and an OFDM receiver according to an embodiment.

FIG. 3 illustrates communication channels 306 that may exist between an OFDM transmitter 312 and an OFDM receiver 314 according to an embodiment. As shown, communication from the OFDM transmitter 312 to the OFDM receiver 314 may occur over a first communication channel 306*a*. Communication from the OFDM receiver 314 to the OFDM transmitter 312 may occur over a second communication channel 306*b*.

The first communication channel 306*a* and the second communication channel 306*b* may be separate communication channels 306. For example, there may be no overlap between the transmission band of the first communication channel 306*a* and the transmission band of the second communication channel 306*b*.

Figure 4:
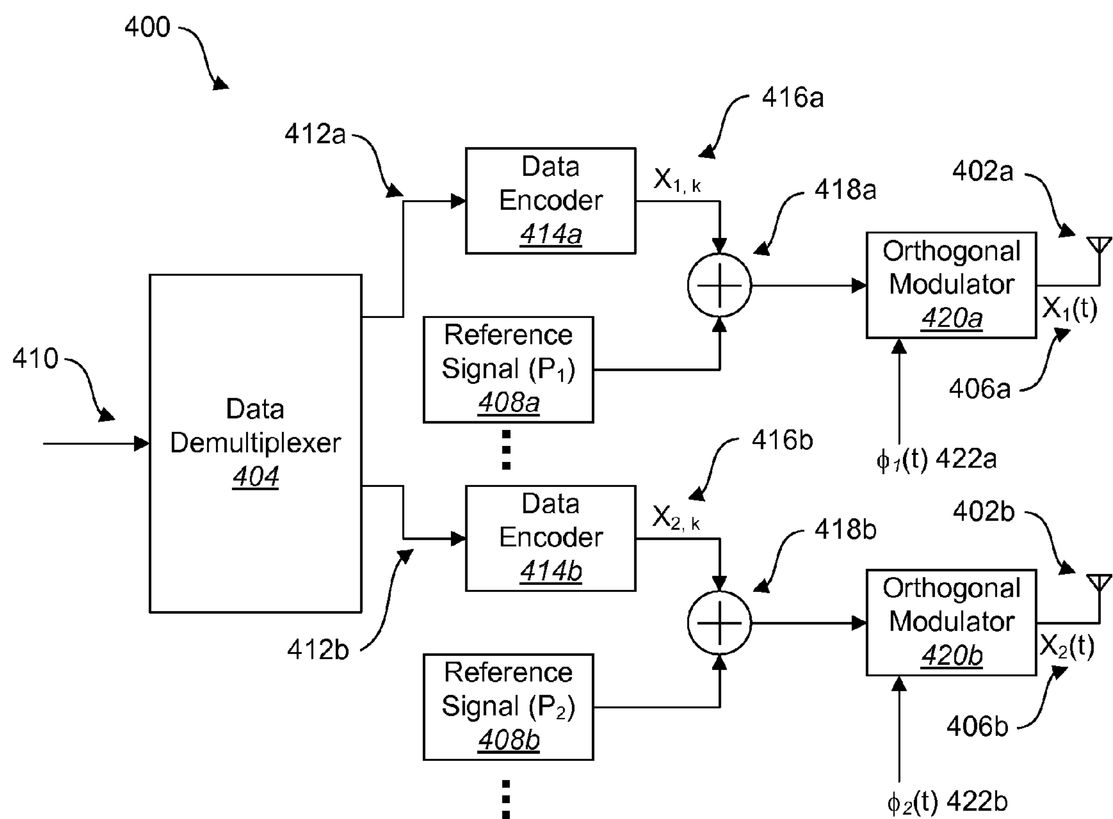
FIG. 4 is a block diagram illustrating one embodiment of a transmitter in which two antennas are used to transmit two data signals with two reference signals using an orthogonal modulation.

FIG. 4 is a block diagram illustrating one embodiment of a transmitter 400 in which two antennas 402*a* and 402*b* are used to transmit two data signals $x_1(t)$ 406*a* and $x_2(t)$ 406*b* with two reference signals $P_1$ 408*a* and $P_2$ 408*b* using an orthogonal modulation. Some embodiments of the transmitter 400 may include a single antenna. In other embodiments, the transmitter 400 may include multiple antennas.

The transmitter 400 may include a data demultiplexer 404 which serves to receive a single data signal 410 and then split the single data signal 410 into multiple signals 412*a* and 412*b*. The multiple signals 412*a*, 412*b* may be encoded by a data encoder 414*a*, 414*b* which serves to change a signal or data into code. The output of each data encoder 414*a*, 414*b* may be referred to as $x_{1,k}$ 416*a* and $x_{2,k}$ 416*b*. A summation function 418*a*, 418*b* may sum the output of the data encoders 414*a*, 414*b* with the reference signals 408*a*, 408*b*. An orthogonal modulator 420*a*, 420*b* may modulate the summed signals with orthogonal functions $\phi_1(t)$ 422*a* and $\phi_2(t)$ 422*b*. The transmitter antennas 402*a*, 402*b* may transmit the modulated signals to a receiver.

Figure 5:
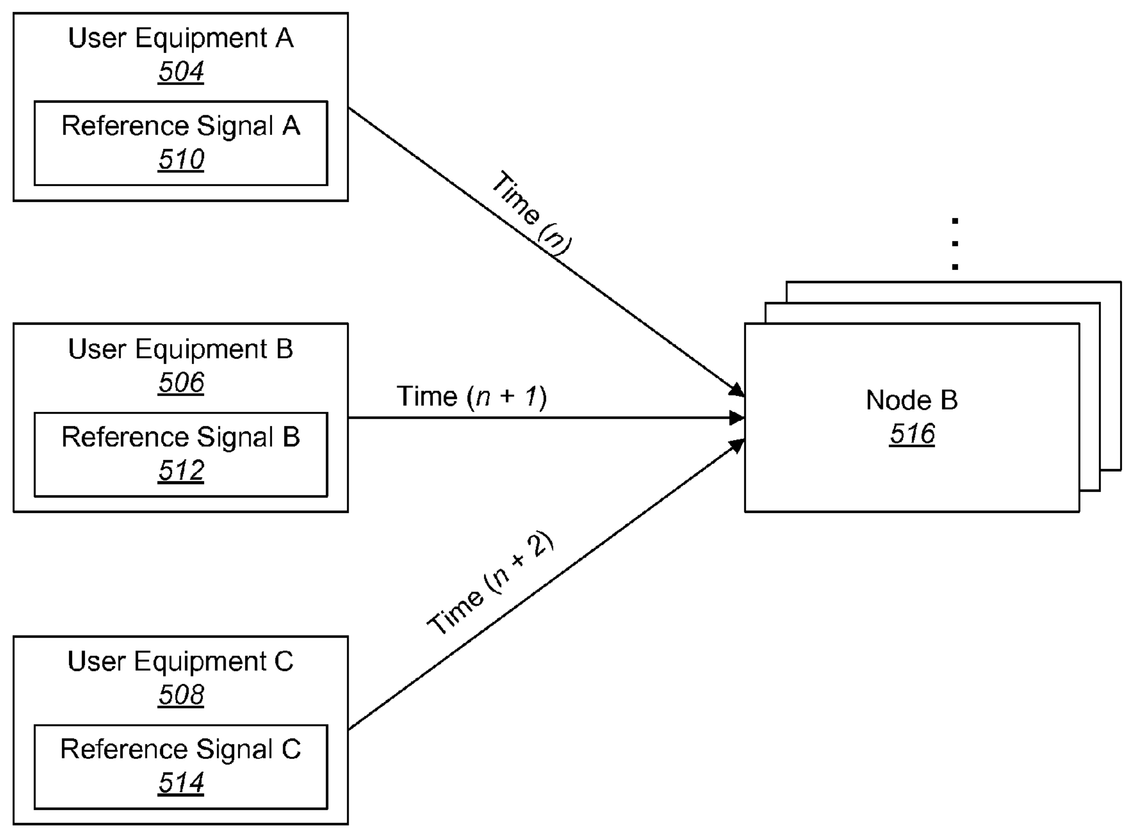
FIG. 5 is a block diagram illustrating one embodiment of a user equipment (UE) transmitting a reference signal to one or more node Bs.

FIG. 5 is a block diagram illustrating one embodiment of a user equipment (UE) 504, 506, 508 transmitting a reference signal to one or more node Bs 516. The UE may include the transmitter 400 as previously explained. The UE 504, 506, 508 may be the user device as described in FIG. 1. Node B 516 may include a base transceiver station (BTS), and may also include the transmitter 400 and a receiver in order to communicate directly with the UE 504, 506, 508.

In one embodiment, each UE 504, 506, 508 transmits a reference signal 510, 512, 514. The reference signal 510, 512, 514 may be a modulated waveform that represents information to be transmitted from the UE 504, 506, 508 to node B 516. As illustrated, user equipment A 504 transmits reference signal A 510, user equipment B 506 transmits reference signal B 512 and user equipment C 508 transmits reference signal C 514. In one embodiment, user equipment A 504 transmits reference signal A 510 to node B 516 at a time (n). User equipment B 506 may transmit reference signal B 512 at a subsequent time, such as time (n+1). Additionally, user equipment C 508 may transmit reference signal C 514 at a subsequent time, such as time (n+2). Thus, each piece of user equipment transmits its reference signal when the other pieces of user equipment are not transmitting their own reference signals (when the other pieces of user equipment are transmitting data). As such, reference signals 510, 512, 514 may be received by node B 516 with multiple access interference that is mostly data, which, if randomly transmitted, may appear as essentially white noise to a transmitter. This may produce a reference signal re-use of unity.

Figure 6:
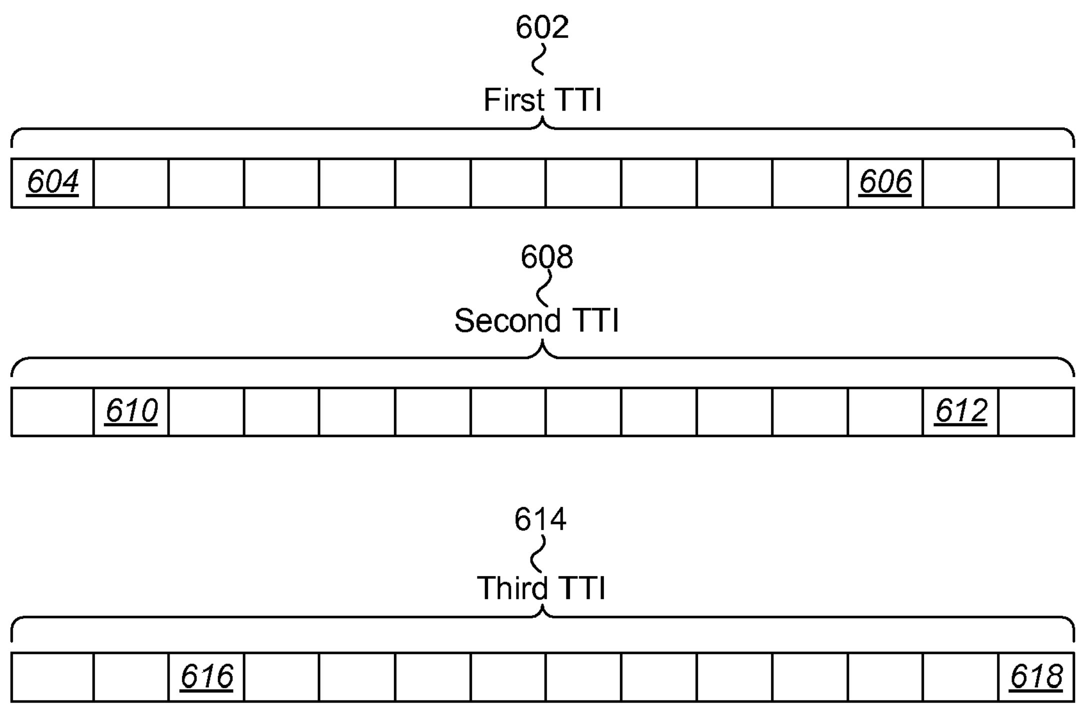
FIG. 6 illustrates one embodiment of a transmission time interval (TTI)

FIG. 6 illustrates one embodiment of a plurality of transmission time intervals (TTIs) 602, 608, 614. Each TTI 602, 608, 614 may also be referred to as a reference signal subframe. A TTI may include a parameter in digital telecommunication networks that is related to encapsulation of data into frames for transmission on a communications channel, such as a radio link. Each TTI 602, 608, 614 may have a length of one millisecond (ms). In one embodiment, each TTI 602, 608, 614 is transmitted from various cells and sectors to the same or different node Bs 516. For example, a first TTI 602 may be transmitted to a first node B, a second TTI 608 may be transmitted to a second node B and a third TTI 614 may be transmitted to a third node B.

The TTI 602, 608, 614 may include a plurality of long blocks. One or more of the long blocks may be designated as a reference signal 604, 606, 610, 612, 616, 618. Each of the long blocks designated as a reference signal may also include cyclic prefixes. In an OFDM symbol, cyclic prefixes may be a repeat of the end of the symbol at the beginning. Cyclic prefixes may allow a multi-path to settle before the main data arrives at a receiver. As illustrated, reference signals 604, 606 associated with the first TTI 602 may be designated long blocks in frames 1 and 12, respectively. The second TTI 604 may designate reference signals 610, 612 to frames 2 and 13, respectively. The third TTI 614 may designate reference signals 616, 618 to frames 3 and 14, respectively. In this embodiment, reference signals 610, 612 associated with the second TTI 608 may be staggered in position compared with reference signals 604, 606 associated with the first TTI 602. Similarly, reference signals 616, 618 associated with the third TTI 614 may be staggered in position compared with reference signals 610, 612 associated with the second TTI 608.

In one embodiment, node B 516 may include various cells and sectors. These different cells and sectors that are associated with a particular node B 516 may be synchronous. In other words, within a plurality of cells or sectors, transmissions to node B 516 may be synchronized. In one embodiment, synchronization may exist with long block transmissions (including cyclic prefixes) as shown in FIG. 6. An expanded re-use of reference signals 604, 606, 610, 612, 616, 618 may be obtained. Staggering the positions of reference signals 604, 606, 610, 612, 616, 618 may also increase the number of reference signals available for transmission to the one or more node Bs 516 by a factor of two. In another embodiment, the available reference signal space may be expanded by a factor of three.

Figure 7:
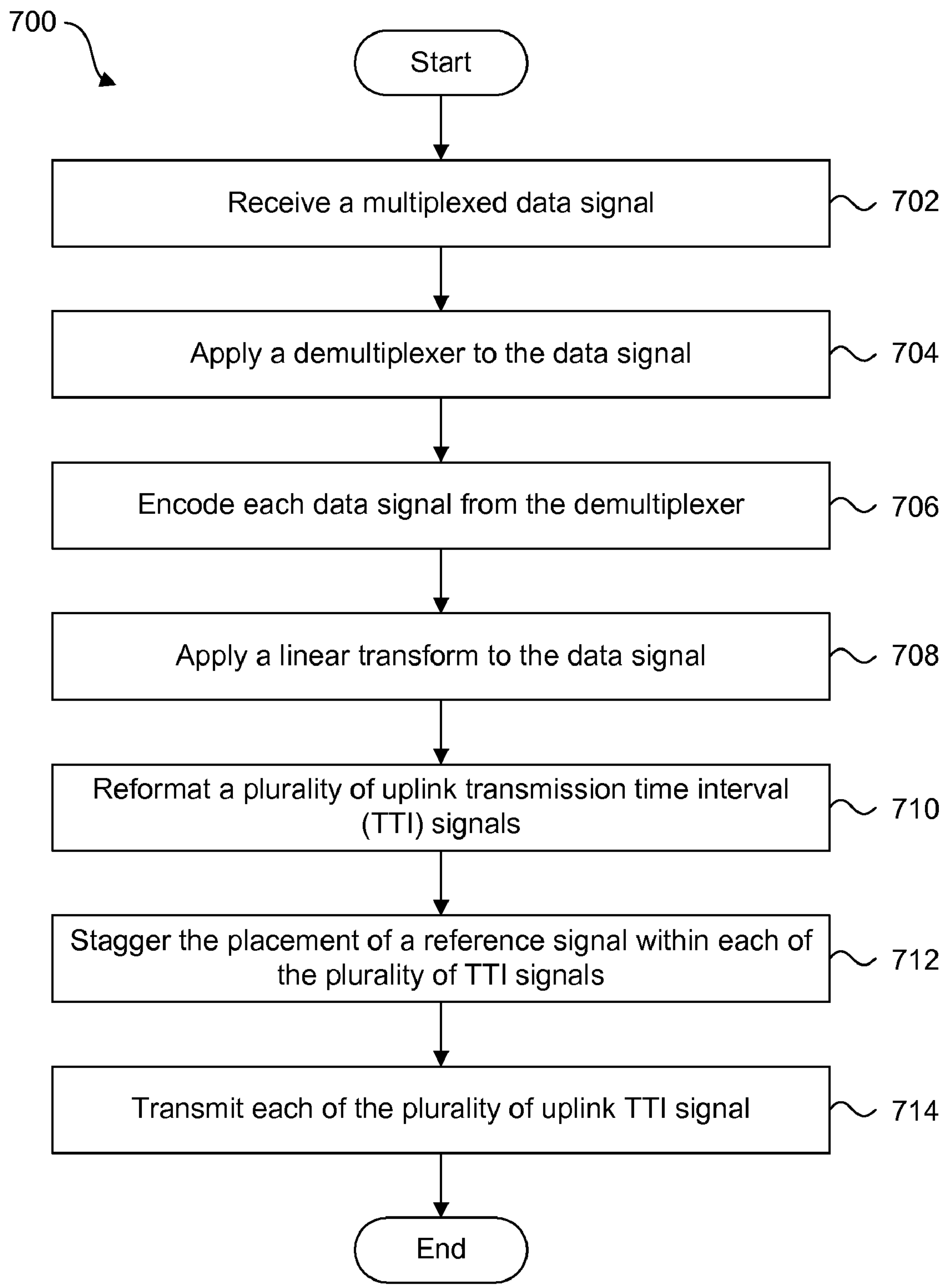
FIG. 7 is a flow diagram illustrating one embodiment of a method to transmit a transmission time interval (TTI) signal with staggered reference signals.

FIG. 7 is a flow diagram illustrating one embodiment of a method 700 to transmit a transmission time interval (TTI) signal with staggered reference signals. In one embodiment, the transmitter 400 may implement the method 700. A multiplexed data signal may be received 702. A demultiplexer 404 may be applied 704 to the data signal. In one embodiment, the demultiplexer 404 may be applied 704 to the data signal in order to split the multiplexed data signal into multiple data signals as previously explained.

In one embodiment, each individual data signal may be encoded 706. In one embodiment, a linear transformation may be applied 708 to the data signal. A plurality of uplink transmission time interval (TTI) signals may be reformatted 710. In one embodiment, the timing within neighboring cells or sectors of the TTI is reformatted to allow reference signals to be transmitted when other signals are transmitting data. The placement of a reference signal within each of the plurality of TTI signals may be staggered 712. In other words, each TTI signal may transmit a reference signal during different time periods. Each of the plurality of uplink TTI signals may be transmitted 714. In one embodiment, each of the plurality of uplink TTI signals are transmitted to one or more node Bs 516.

FIG. 8 is one embodiment of a reference signal placement table 800. As mentioned previously, UEs 504, 506, 508 assigned to different node Bs 516 may transmit reference signals 510, 512, 514 at different times. A system that transmits reference signals 510, 512, 514 at different times may achieve a reference signal re-use factor that approaches unity. As previously stated, if a TTI format such as illustrated in FIG. 6 is implemented, the available reference signal space may be expanded by a factor of three. In one embodiment, uniformly distributing the reference signals in time, for a TTI including fourteen long blocks, may yield reference signal formats illustrated in the table 800 of FIG. 8.

The placement table 800 includes a first column 802 indicating a slot that may be designated for a first reference signal position. For example, the first reference signal position within a TTI may range from slot 1 to slot 7. The placement table 800 also includes a second column 804 indicating a slot that may be designated for a second reference signal position. For example, the second reference signal position within a TTI may range from slot 8 to slot 14. In one embodiment, the first and second reference signal positions may be separated by six long blocks within the TTI. The placement table 800 may be implemented if the granularity of resource block assignments is strictly greater than one (1) ms. However, if the granularity of resource block assignments is one (1) ms, the format illustrated in FIG. 6 may be implemented.

Figure 9:
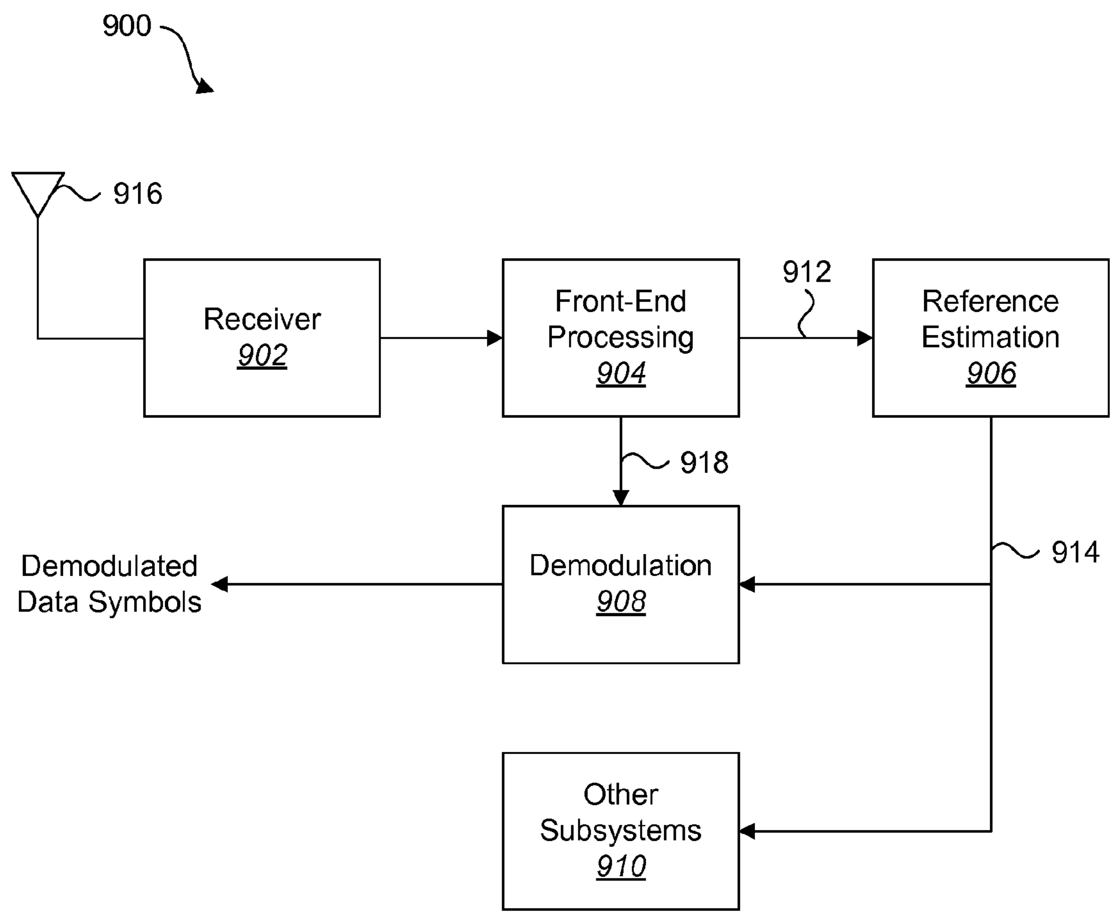
FIG. 9 illustrates a block diagram of certain components in an embodiment of a receiver.

FIG. 9 illustrates a block diagram 900 of certain components in an embodiment of a receiver 902. In one embodiment, the receiver 902 may be a node B 516. Other components that are typically included in the receiver 902 may not be illustrated for the purpose of focusing on the novel features of the embodiments herein.

A signal may be received at an antenna 916. In one embodiment, the signal includes both the reference signal and the data sent from the transmitter 400. The signal is provided by the antenna 916 to the receiver 902. The receiver 902 down-converts the signal and provides it to a front-end processing component 904. The front-end processing component 904 may separate the reference signal from the data signal. The front-end processing component 904 may provide the received reference signal 912 to a reference estimation component 906. The received reference signal 912 typically includes noise and usually suffers from fading. The front-end processing component 904 may also provide the data 918 to a demodulation component 908 that demodulates the data signal.

The reference estimation component 906 may provide an estimated reference signal 914 to the demodulation component 908. The reference estimation component 906 may also provide the estimated reference signal 914 to other subsystems 910.

Additional processing takes place at the receiver 902. Generally, the reference estimation component 906 operates to estimate the reference signal and effectively clean-up the reference signal by reducing the noise and estimating the original reference (sometimes referred to as pilot) signal that was transmitted.

Figure 10:
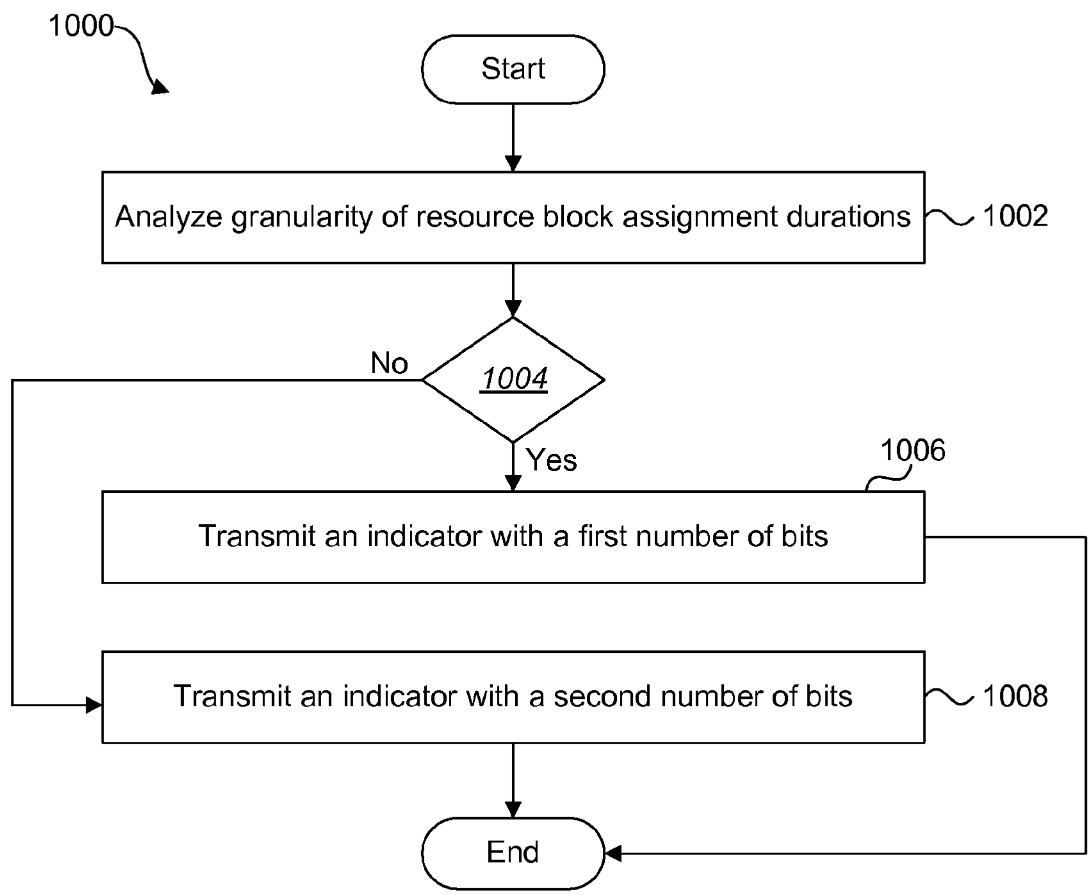
FIG. 10 is a flow diagram illustrating one embodiment of a method for signaling to a user equipment as to which long blocks within a TTI may be allocated for reference signal transmission.

FIG. 10 is a flow diagram illustrating one embodiment of a method 1000 for signaling to a UE as to which long blocks within a TTI may be allocated for reference signal transmission. The method 1000 may be implemented by node B 516. In one embodiment, a granularity of resource block assignment durations is analyzed 1002. A determination 1004 is made as to whether the granularity of resource block assignment durations is greater than one (1) ms. If it is determined 1004 that the granularity is greater than 1 ms, an indicator including a first number of bits may be transmitted 1006. In one embodiment, the indicator includes three bits. The indicator may indicate to the UE cyclic shifts of the positions of the reference signals in the TTI. However, if it is determined 1004 that the granularity not greater than one (1) ms, an indicator including a second number of bits may be transmitted 1008. In one embodiment, the indicator includes two bits.

Figure 11:
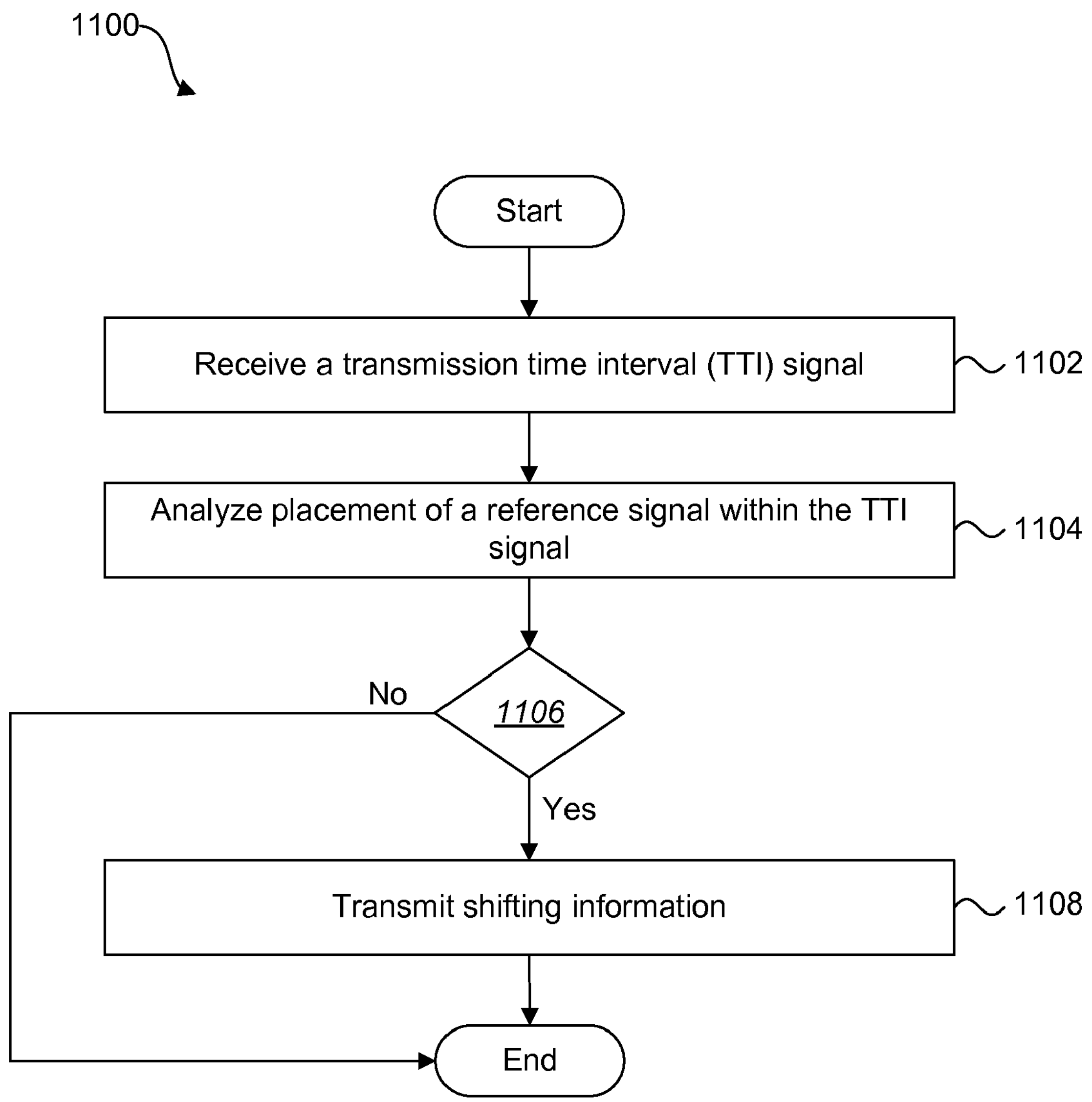
FIG. 11 is a flow diagram illustrating one embodiment of a method for transmitting information amongst a plurality of node Bs.

FIG. 11 is a flow diagram illustrating one embodiment of a method 1100 for transmitting information amongst a plurality of node Bs 516. The method 1100 may be implemented by one of the plurality of node Bs 516. In one embodiment, the information indicates a shift in the timing intervals of a TTI signal from one node B 516 to another. The shifts may be approximately 70.7 micro-seconds (μs). In other words, with respect to a common timing base of transmission on a downlink (base station to a mobile station), a time shift relative to that broadcast time base for TTI transmissions may have been transmitted.

A transmission time interval (TTI) signal may be received 1102. The placement of a reference signal within the TTI signal may be analyzed 1104. A determination 1106 may be made as to whether the placement of the reference signal includes a timing shift. In one embodiment, a determination 1106 is made as to whether the placement includes a timing shift of approximately 70.7 μs per shift. If the placement includes a timing shift, the shifting information may be transmitted 1108. In one embodiment, the shifting information is transmitted 1108 to a plurality of node Bs 516.

Figure 12:
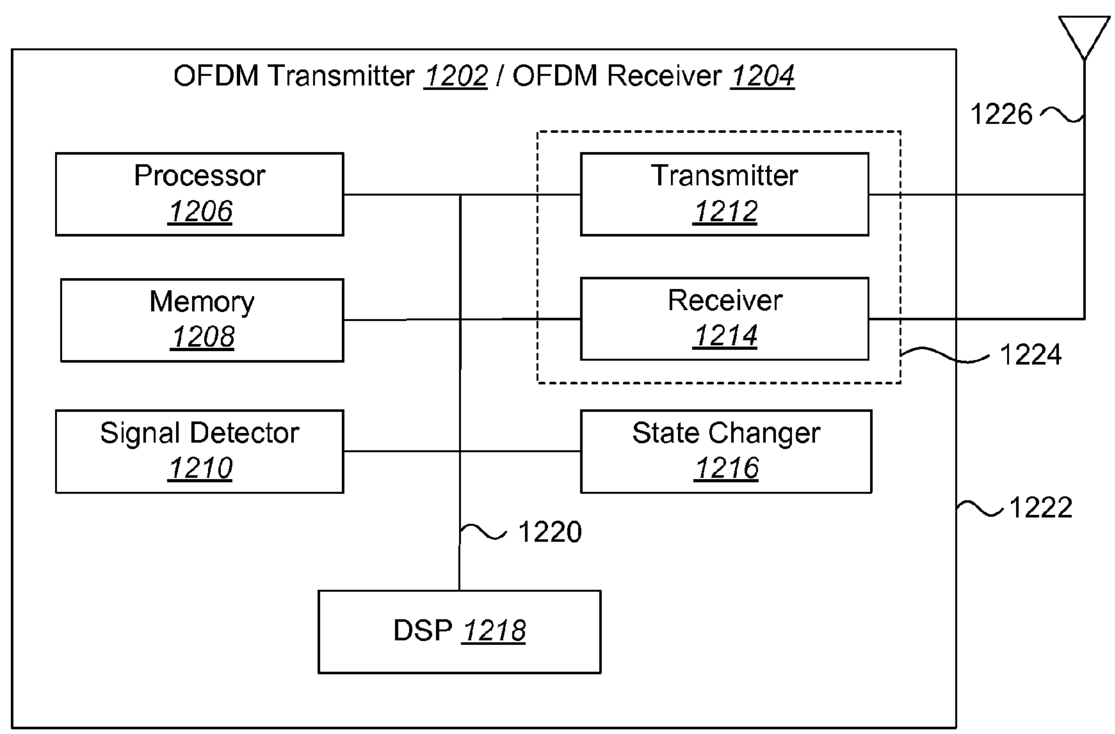
FIG. 12 illustrates various components that may be utilized in an OFDM transmitter and/or an OFDM receiver.

FIG. 12 illustrates various components that may be utilized in an OFDM transmitter 1202 and/or an OFDM receiver 1204. The OFDM transmitter 1202 and/or OFDM receiver 1204 includes a processor 1206 which controls operation of the OFDM transmitter 1202 and/or OFDM receiver 1204. The processor 1206 may also be referred to as a CPU. Memory 1208, which may include both read-only memory (ROM) and random access memory (RAM), provides instructions and data to the processor 1206. A portion of the memory 1208 may also include non-volatile random access memory (NVRAM).

The OFDM transmitter 1202 and/or OFDM receiver 1204 may also include a housing 1222 that contains a transmitter 1212 and a receiver 1214 to allow transmission and reception of data. The transmitter 1212 and receiver 1214 may be combined into a transceiver 1224. An antenna 1226 is attached to the housing 1222 and electrically coupled to the transceiver 1212. Additional antennas (not shown) may also be used.

The OFDM transmitter 1202 and/or OFDM receiver 1204 may also include a signal detector 1210 used to detect and quantify the level of signals received by the transceiver 1224. The signal detector 1210 detects such signals as total energy, pilot energy, power spectral density, and other signals.

A state changer 1216 controls the state of the OFDM transmitter 1202 and/or OFDM receiver 1204 based on a current state and additional signals received by the transceiver 1224 and detected by the signal detector 1210. The OFDM transmitter 1202 and/or OFDM receiver 1204 may be capable of operating in any one of a number of states.

The various components of the OFDM transmitter 1202 and/or OFDM receiver 1204 are coupled together by a bus system 1220 which may include a power bus, a control signal bus, and a status signal bus in addition to a data bus. However, for the sake of clarity, the various buses are illustrated in FIG. 12 as the bus system 1220. The OFDM transmitter 1202 and/or OFDM receiver 1204 may also include a digital signal processor (DSP) 1218 for use in processing signals. One skilled in the art will appreciate that the OFDM transmitter 1202 and/or OFDM receiver 1204 illustrated in FIG. 12 is a functional block diagram rather than a listing of specific components.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array signal (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

The methods disclosed herein comprise one or more steps or actions for achieving the described method. The method steps and/or actions may be interchanged with one another without departing from the scope of the present invention. In other words, unless a specific order of steps or actions is required for proper operation of the embodiment, the order and/or use of specific steps and/or actions may be modified without departing from the scope of the present invention.

While specific embodiments and applications of the present invention have been illustrated and described, it is to be understood that the invention is not limited to the precise configuration and components disclosed herein. Various modifications, changes, and variations which will be apparent to those skilled in the art may be made in the arrangement, operation, and details of the methods and systems of the present invention disclosed herein without departing from the spirit and scope of the invention.

What is claimed is:

1. A method for transmitting a transmission time interval signal in a cellular network, the method comprising:
- receiving a multiplexed data signal;
- applying a demultiplexer to the data signal;
- encoding the data signal from the demultiplexer;
- applying a linear transform to the data signal;
- reformatting a plurality of uplink transmission time interval signals which include the data signal;
- receiving an indicator comprising a first number of bits or a second number of bits depending on whether granularity of resource block assignment durations is greater than a first time period;
- staggering a timing position of a pair of reference signals within each of the plurality of transmission time interval signals, wherein the pair of reference signals are received with multiple access interference related to data, and wherein the timing position is based on the indicator; and
- transmitting each of the plurality of uplink transmission time interval signals.

2. The method of claim 1, further comprising reformatting timing parameters within adjacent cells of one of the plurality of transmission time interval signals.

3. The method of claim 1, wherein the pair of reference signals are transmitted simultaneously with one or more data signals.

4. The method of claim 1, wherein each of the pair of reference signals is transmitted during different time periods.

5. The method of claim 1, wherein each of the plurality of transmission time interval signals comprises fourteen long blocks.

6. The method of claim 5, wherein each of the fourteen long blocks comprises a length of 66.67 microseconds (μs).

7. The method of claim 5, wherein each of the fourteen long blocks comprises a cyclic prefix.

8. The method of claim 1, wherein each of the plurality of transmission time interval signals comprises a length of one millisecond (ms).

9. An apparatus that is configured to transmit a transmission time interval signal in a cellular network, the computer system comprising:
- a processor;
- memory in electronic communication with the processor;
- instructions stored in the memory, the instructions being executable to:

receive a multiplexed data signal;

apply a demultiplexer to the data signal;

encode the data signal from the demultiplexer;

apply a linear transform to the data signal;

reformat a plurality of uplink transmission time interval signals which include the data signal;

receive an indicator comprising a first number of bits or a second number of bits depending on whether granularity of resource block assignment durations is greater than a first time period;

stagger a timing position of a pair of reference signals within each of the plurality of transmission time interval signals, wherein the pair reference signals are received with multiple access interference related to data, and wherein the timing position is based on the indicator; and transmit each of the plurality of uplink transmission time interval signals.

10. The apparatus of claim 9, wherein the instructions are further executable to reformat timing parameters within adjacent cells of one of the plurality of transmission time interval signals.

11. The apparatus of claim 9, wherein the pair of reference signals are transmitted simultaneously with one or more data signals.

12. The apparatus of claim 9, wherein each of the pair of reference signals is transmitted during different time periods.

13. The apparatus of claim 9, wherein each of the plurality of transmission time interval signals comprises fourteen long blocks.

14. The apparatus of claim 13, wherein each of the fourteen long blocks comprises a length of 66.67 microseconds (μs).

15. The apparatus of claim 13, wherein each of the fourteen long blocks comprises a cyclic prefix.

16. The apparatus of claim 9, wherein each of the plurality of transmission time interval signals comprises a length of one millisecond (ms).

17. A method for allocating positions for a reference signal within a transmission time interval in a cellular network, the method comprising:

analyzing granularity of resource block assignment durations;

determining if the granularity of resource block assignment durations is greater than a first time period;

transmitting, via a transmitter, an indicator comprising a first number of bits or a second number of bits depending on the determination; and receiving a transmission time interval signal in which a timing position of one or more reference signals within the transmission time interval signal is based on the indicator.

18. The method of claim 17, further comprising determining if the granularity of the resource block assignment durations is greater than one millisecond.

* * * * *